United States Patent
Saikyo et al.

(10) Patent No.: US 11,054,832 B2
(45) Date of Patent: Jul. 6, 2021

(54) VEHICLE CONTROL DEVICE FOR SETTING VEHICLE OFFSET SPACING

(71) Applicant: HONDA MOTOR CO., LTD., Tokyo (JP)

(72) Inventors: Marina Saikyo, Wako (JP); Hiroshi Miura, Wako (JP); Suguru Yanagihara, Wako (JP); Yuta Takada, Tokyo (JP); Shogo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 16/284,539

(22) Filed: Feb. 25, 2019

(65) Prior Publication Data
US 2019/0265709 A1 Aug. 29, 2019

(30) Foreign Application Priority Data
Feb. 26, 2018 (JP) .............................. JP2018-031554

(51) Int. Cl.
*G05D 1/02* (2020.01)
*B60W 30/12* (2020.01)

(52) U.S. Cl.
CPC ........... *G05D 1/0214* (2013.01); *B60W 30/12* (2013.01); *G05D 1/0231* (2013.01); *G05D 1/0257* (2013.01); *G05D 2201/0212* (2013.01); *G05D 2201/0213* (2013.01)

(58) Field of Classification Search
CPC .............................. G05D 1/0214; B60W 30/12
See application file for complete search history.

(56) References Cited

U.S. PATENT DOCUMENTS

| | | | | |
|---|---|---|---|---|
| 8,892,356 B1* | 11/2014 | Weiland | ................. | G06F 16/29 701/431 |
| 2006/0095195 A1* | 5/2006 | Nishimura | .......... | B60W 30/025 701/96 |
| 2011/0205086 A1* | 8/2011 | Lamprecht | ............. | G08G 1/087 340/928 |

(Continued)

FOREIGN PATENT DOCUMENTS

| | | | |
|---|---|---|---|
| JP | 2006-131055 A | 5/2006 | |
| JP | 2008-293269 A | 12/2008 | |

(Continued)

OTHER PUBLICATIONS

Office Action dated Aug. 27, 2019 issued over the corresponding Japanese Patent Application 2018-031554 with the English translation thereof.

(Continued)

*Primary Examiner* — Jess Whittington
(74) *Attorney, Agent, or Firm* — Carrier Blackman & Associates, P.C.; Jeffrey T. Gedeon; Joseph P. Carrier

(57) ABSTRACT

If an external environment recognition unit recognizes another vehicle that is positioned along a travel lane, an offset setting unit sets an offset amount in a direction of separating a host vehicle from the other vehicle. The offset setting unit sets the offset amount (predetermined amount) to be smaller in a case where the external environment recognition unit identifies the other vehicle as a streetcar, than the offset amount (predetermined amount) in a case where the external environment recognition unit identifies the other vehicle as an vehicle other than the streetcar.

3 Claims, 11 Drawing Sheets

(56) References Cited

U.S. PATENT DOCUMENTS

| | | | |
|---|---|---|---|
| 2015/0094943 A1 | 4/2015 | Yoshihama et al. | |
| 2017/0144682 A1 | 5/2017 | Kamei et al. | |
| 2017/0262709 A1* | 9/2017 | Wellington | G06K 9/6201 |
| 2019/0073904 A1* | 3/2019 | Heinla | G05D 1/0088 |

FOREIGN PATENT DOCUMENTS

| | | | |
|---|---|---|---|
| JP | 2015-189404 A | 11/2015 | |
| WO | 2013/140513 A1 | 9/2013 | |
| WO | 2015/198423 A1 | 12/2015 | |

OTHER PUBLICATIONS

Office Action dated Oct. 13, 2020 issued over the divisional Japanese Patent Application No. 2019-220089, which was derived from the corresponding Japanese Patent Application No. 2018-031554 with the English translation.

"When Passing by a Side of a Stopped Tramcar" in Blog of a Labor and Social Security Attorney Wishing for Traffic Safety in Kobe (URL: https://ameblo.jp/kobe-drivers-support/entry-12237777819.html), posted on Feb. 27, 2017, with the English translation of p. 1 of the URL>.

* cited by examiner

FIG. 11

| No | CIRCUMSTANCE | | | OPERATION | | | |
|---|---|---|---|---|---|---|---|
| | STREETCAR | SAFETY ZONE | PERSON | SLOW DOWN | OFFSET | STOP TEMPORARILY | |
| 1 | STOPPING | NOT PRESENT | NOT PRESENT | TAKE ACTION | TAKE ACTION (X1) | NOT TAKE ACTION | |
| 2 | STOPPING | NOT PRESENT | PRESENT | TAKE ACTION | TAKE ACTION (X1) | TAKE ACTION | |
| 3 | STOPPING | PRESENT | PRESENT | TAKE ACTION | NOT TAKE ACTION | NOT TAKE ACTION | |
| 4 | STOPPING | PRESENT | NOT PRESENT | TAKE ACTION | NOT TAKE ACTION | NOT TAKE ACTION | |
| 5 | NONE | NOT PRESENT | NOT PRESENT | NOT TAKE ACTION | NOT TAKE ACTION | NOT TAKE ACTION | |
| 6 | NONE | PRESENT | PRESENT | TAKE ACTION | NOT TAKE ACTION | NOT TAKE ACTION | |
| 7 | NONE | PRESENT | NOT PRESENT | NOT TAKE ACTION | NOT TAKE ACTION | NOT TAKE ACTION | |
| 8 | NONE | NOT PRESENT | PRESENT | TAKE ACTION | NOT TAKE ACTION | NOT TAKE ACTION | |
| 9 | TRAVELING (SIDE BY SIDE) | NOT PRESENT | NOT PRESENT | NOT TAKE ACTION | NOT TAKE ACTION | NOT TAKE ACTION | |
| 10 | TRAVELING (CURVE) | NOT PRESENT | NOT PRESENT | NOT TAKE ACTION | TAKE ACTION (X1) | NOT TAKE ACTION | |

VEHICLE CONTROL DEVICE FOR SETTING VEHICLE OFFSET SPACING

CROSS-REFERENCE TO RELATED APPLICATION

This application is based upon and claims the benefit of priority from Japanese Patent Application No. 2018-031554 filed on Feb. 26, 2018, the contents of which are incorporated herein by reference.

BACKGROUND OF THE INVENTION

Field of the Invention

The present invention relates to a vehicle control device that performs automated driving or driving assistance of a host vehicle, and particularly a vehicle control device that controls the host vehicle on a road where a railroad track of a streetcar is laid.

Description of the Related Art

Japanese Laid-Open Patent Publication No. 2008-293269 discloses a navigation device. In a case where a host vehicle driven by a vehicle occupant turns right to cross a track of a streetcar and the streetcar approaches the host vehicle from behind, this navigation device notifies the vehicle occupant of an approach of the streetcar.

Incidentally, an automated driving vehicle or a driving assistance vehicle, in which at least one of driving force output control, braking control, and steering control of a host vehicle is performed by a vehicle control device, has been developed. In the present specification, the driving assistance is regarded as one type of the automated driving, and the driving assistance vehicle is included in the automated driving vehicle.

When the vehicle occupant drives the host vehicle, the vehicle occupant causes the host vehicle to stay away from another vehicle that travels in the next travel lane in a lateral direction on the assumption that the other vehicle suddenly moves in the lateral direction to approach the host vehicle. Similarly, the automated driving vehicle preferably stays away from the other vehicle that travels in the next lane in the lateral direction. For this purpose, the host vehicle travels while setting an offset amount in the travel lane in the lateral direction and controlling the position in the lateral direction.

On the other hand, the vehicle preferably travels at a constant position in the travel lane, for example, at a substantially central position in the travel lane. From such a perspective, the offset amount is preferably smaller. Since the streetcar travels along the track that is laid on the road, the streetcar will not move suddenly in the lateral direction. Therefore, the offset amount may be decreased when the other vehicle that travels or stops beside the host vehicle is a streetcar.

SUMMARY OF THE INVENTION

The navigation device according to Japanese Laid-Open Patent Publication No. 2008-293269 merely notifies the vehicle occupant when recognizing the streetcar, and this publication does not disclose the relation between the streetcar and the offset amount of the host vehicle in the lateral direction.

The present invention has been made in view of the above circumstance and an object is to provide a vehicle control device that enables a host vehicle to travel at an optimal position in a travel lane by setting an offset amount of the host vehicle in a lateral direction as appropriate.

A vehicle control device according to the present invention includes: an external environment recognition unit configured to recognize a peripheral state of a host vehicle; an offset setting unit configured to set an offset amount of the host vehicle in a travel lane in a lateral direction on a basis of the peripheral state that is recognized by the external environment recognition unit; and a vehicle control unit configured to perform travel position control of the host vehicle on the basis of the offset amount that is set by the offset setting unit, wherein if the external environment recognition unit recognizes another vehicle that is positioned along the travel lane, the offset setting unit is configured to set the offset amount in a direction of separating the host vehicle from the other vehicle, and set the offset amount to be smaller in a case where the external environment recognition unit identifies the other vehicle as a track traveling vehicle, compared with the offset amount in a case where the external environment recognition unit identifies the other vehicle as a vehicle other than the track traveling vehicle, the track traveling vehicle being a vehicle traveling on a track laid on a road.

In the above configuration, the offset amount that is set in the case where the other vehicle is the track traveling vehicle such as a streetcar, is smaller than the offset amount that is set in the case where the other vehicle is a vehicle other than the track traveling vehicle. The vehicle other than the track traveling vehicle may travel out of the travel lane; on the other hand, the track traveling vehicle does not travel out of the travel lane. Therefore, the offset for the track traveling vehicle may be the minimum offset. In other words, a large offset is unnecessary. Therefore, in a case where the track traveling vehicle travels or stops next to the host vehicle, the host vehicle can travel at a substantially constant position in the travel lane. In addition, in a case where the vehicle other than the track traveling vehicle travels or stops next to the host vehicle, the host vehicle can stay away from the other vehicle to some extent. In this manner, the host vehicle can travel at an optimal position in the travel lane.

In the present invention, if the track or the travel lane that is recognized by the external environment recognition unit has a predetermined curvature or more, the offset setting unit may be configured to set the offset amount in accordance with the curvature of the track or the travel lane.

In a scene where the track traveling vehicle curves, a part of a vehicle body of the track traveling vehicle approaches the next travel lane. In the above configuration, the offset amount is set in accordance with the curvature of the track or the travel lane. Therefore, the host vehicle can stay away to some extent from the track traveling vehicle that curves.

In the present invention, if a reflectance of a vehicle body of the other vehicle that is detected by a radar or a lidar is more than or equal to a predetermined threshold, the external environment recognition unit may be configured to identify the other vehicle as the track traveling vehicle.

The vehicle body of the track traveling vehicle has a larger area to reflect electric waves than the vehicle body of the vehicle other than the track traveling vehicle, such as a large vehicle or a normal vehicle. Therefore, by detecting the reflectance of the vehicle body by the radar or the lidar as described in the above configuration, it is possible to determine whether the other vehicle is the track traveling vehicle or the vehicle other than the track traveling vehicle.

In the present invention, if a reflectance of a road surface that is detected by a radar or a lidar is more than or equal to a predetermined threshold, the external environment recognition unit may be configured to identify the other vehicle as the track traveling vehicle.

A road surface of a road where the track (railroad track) made of metal is laid reflects more electric waves than a road surface of a general road. Therefore, by detecting the reflectance of the road surface by the radar or the lidar in the above structure as described in the above configuration, it is possible to determine whether the other vehicle traveling on the road surface is the track traveling vehicle or the vehicle other than the track traveling vehicle.

In the present invention, if an indicator expressing visibility of a wheel of the other vehicle is less than a predetermined threshold, the external environment recognition unit may be configured to identify the other vehicle as the track traveling vehicle.

The shield rate of the wheel of the track traveling vehicle is higher than that of the vehicle other than the track traveling vehicle, and the wheel of the track traveling vehicle is less visible from the host vehicle. Therefore, as described in the above configuration, by detecting the indicator expressing the visibility of the wheel of the other vehicle, for example the shield rate of the wheel, it is possible to determine whether the other vehicle is the track traveling vehicle or the vehicle other than the track traveling vehicle.

In the present invention, if the other vehicle has a vehicle height that is more than or equal to a predetermined threshold and it is recognized that the other vehicle has a characteristic of an external appearance of the track traveling vehicle, the external environment recognition unit may be configured to identify the other vehicle as the track traveling vehicle.

The track traveling vehicle has a higher vehicle height than the vehicle other than the track traveling vehicle. In addition, the track traveling vehicle may have a characteristic in its external appearance. Therefore, by detecting the vehicle height or the characteristic of the external appearance as described in the above configuration, it is possible to determine whether the other vehicle is the track traveling vehicle or the vehicle other than the track traveling vehicle.

In the present invention, if the external environment recognition unit recognizes a stop of the track traveling vehicle in a travel direction of the host vehicle, the offset setting unit may be configured to set the offset amount in accordance with presence or absence of the track traveling vehicle in the stop and/or a form of the stop.

The optimal offset amount of the host vehicle is different depending on whether the track traveling vehicle stops or does not stop in the stop or whether the stop has or does not have a safety zone, for example. In the above configuration, the offset amount is set in accordance with the presence or absence of the track traveling vehicle in the stop and/or the form of the stop. Therefore, near the stop, the host vehicle can travel at the optimal position in the travel lane.

According to the present invention, the host vehicle can travel at the optimal position in the travel lane.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 11 is a table showing a relation between the circumstances around the host vehicle and operations of the host vehicle in those circumstances.

DESCRIPTION OF THE PREFERRED EMBODIMENTS

A preferred embodiment of a vehicle control device according to the present invention will be described in detail with reference to the attached drawings.

1. Configuration of Host Vehicle 10

Figure 1:
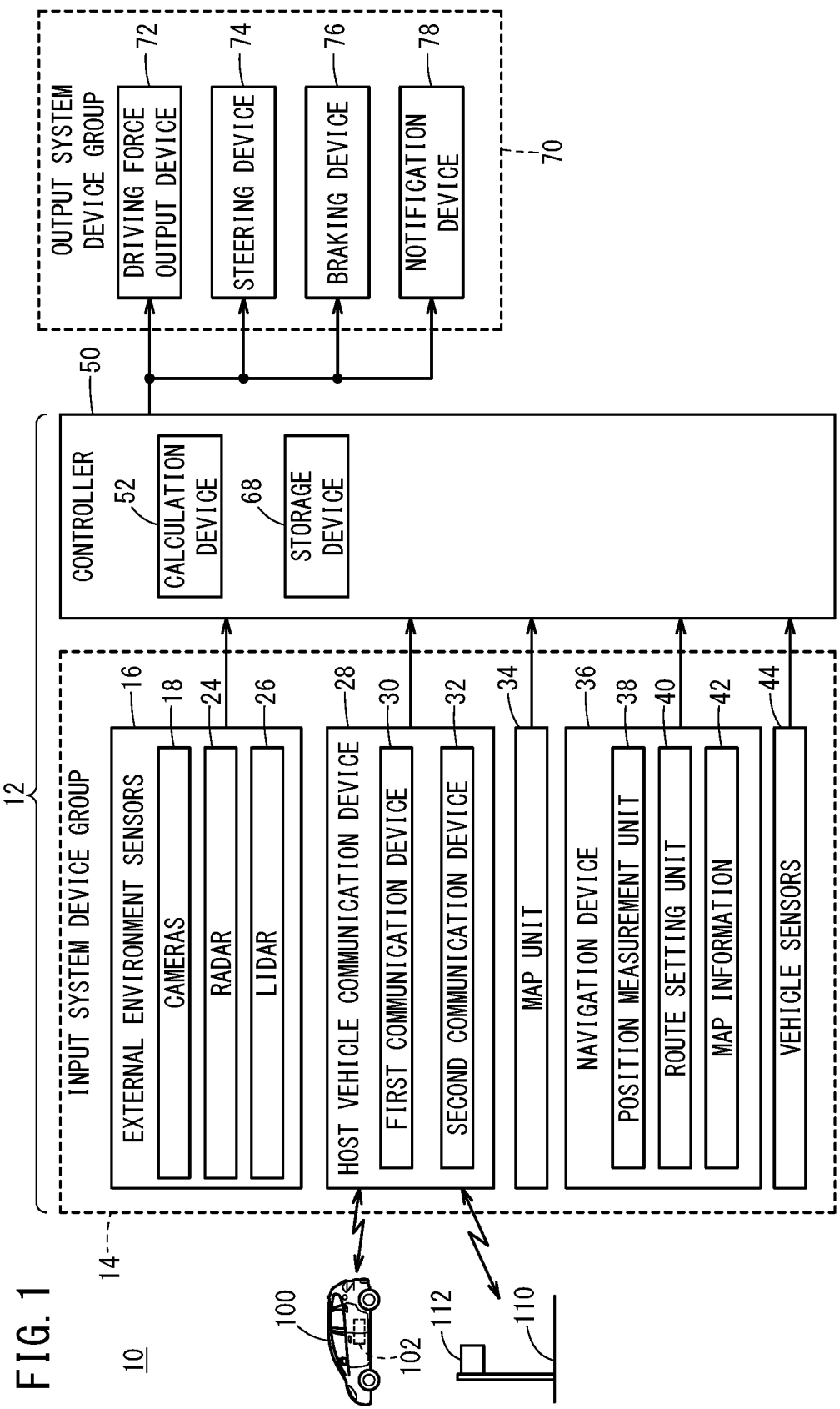
FIG. 1 is a block diagram of a host vehicle including a vehicle control device according to one embodiment.

As illustrated in FIG. 1, a host vehicle 10 includes an input system device group 14 that acquires or stores various kinds of information, a controller 50 to which information output from the input system device group 14 is input, and an output system device group 70 that operates in accordance with various instructions output from the controller 50. A vehicle control device 12 according to the present embodiment includes the input system device group 14 and the controller 50. The host vehicle 10 is an automated driving vehicle in which travel control is performed by the controller 50 (including fully automated driving vehicle) or a driving assistance vehicle in which travel control is assisted partially.

1.1. Input System Device Group 14

The input system device group 14 includes an external environment sensor 16, a host vehicle communication device 28, a map unit 34, a navigation device 36, and vehicle sensors 44. The external environment sensor 16 detects a state of a periphery (external environment) of the host vehicle 10. The external environment sensor 16 includes a plurality of cameras 18 that capture images of the external environment, a plurality of radars 24 that detects the distance and the relative speed between the host vehicle 10 and peripheral objects, and one or more lidars 26. The host vehicle communication device 28 includes a first communication device 30 and a second communication device 32. The first communication device 30 performs inter-vehicle communication with an other-vehicle communication device 102 provided on another vehicle 100 to acquire external environment information including information regarding the other vehicle 100 (such as a type of vehicle, a travel state, or a travel position). The second communication device 32 performs road-vehicle communication with a road-side communication device 112 provided on an infrastructure such as a road 110 to acquire external environment information including the road information (such as information regarding a traffic light or a traffic jam). The map unit 34 stores a high-precision map the positional precision of which is less than or equal to centimeter units. The navigation device 36 includes a position measurement unit 38 that measures the position of the host vehicle 10 by a satellite navigation method and/or a self-contained navigation method, map information 42, and a route setting unit 40 that sets a scheduled route from the position of the host vehicle 10 to a destination on the basis of the map information 42. The vehicle sensors 44 detect the travel state of the host vehicle 10. The vehicle sensors 44 include a vehicle speed sensor, an acceleration sensor, a yaw rate sensor, an inclination sensor, a travel distance sensor, and the like, that are not shown.

1.2. Output System Device Group 70

The output system device group 70 includes a driving force output device 72, a steering device 74, a braking device 76, and a notification device 78. The driving force output device 72 includes a driving force output ECU, and a driving source such as an engine or a traction motor. The driving force output device 72 generates driving force in accordance with a vehicle occupant's operation of an accelerator pedal or a driving control instruction that is output from the controller 50. The steering device 74 includes an electric power steering system (EPS) ECU and an EPS actuator. The steering device 74 generates a steering force in accordance with a vehicle occupant's operation of a steering wheel or a steering control instruction that is output from the controller 50. The braking device 76 includes a braking ECU and a braking actuator. The braking device 76 generates a braking force in accordance with a vehicle occupant's operation of a braking pedal or a braking control instruction that is output from the controller 50. The notification device 78 includes a notification ECU and an information transmission device (such as a display device, an audio device, or a haptic device). The notification device 78 notifies a vehicle occupant in accordance with a notification instruction that is output from the controller 50 or another ECU.

1.3. Controller 50

Figure 2:
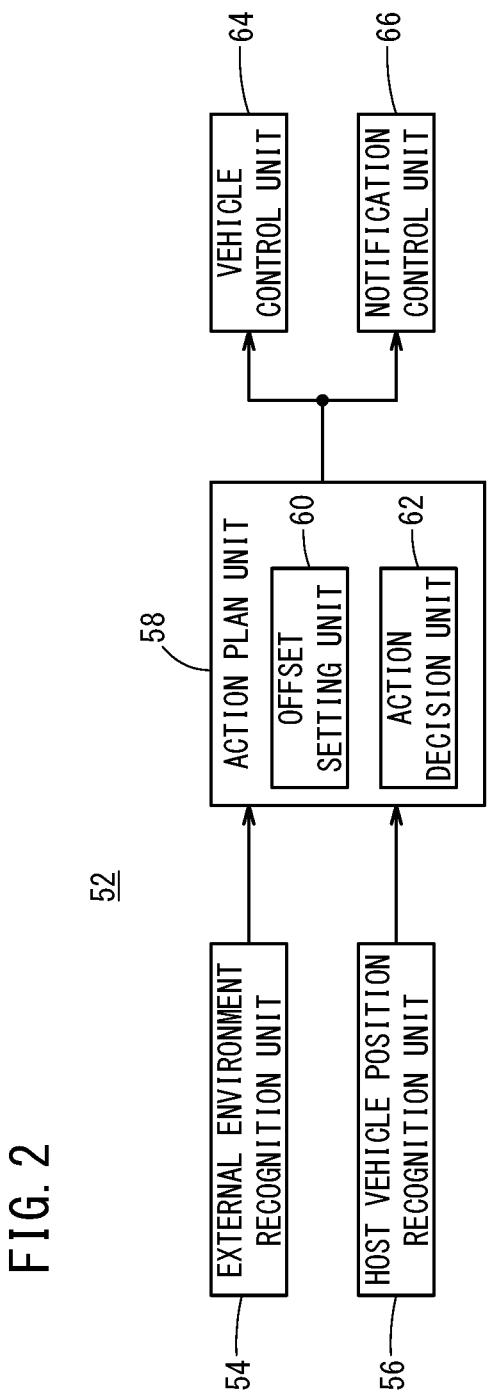
FIG. 2 is a function block diagram of a calculation device.

The controller 50 is configured by an ECU, and includes a calculation device 52 such as a processor and a storage device 68 such as a ROM or a RAM. The controller 50 achieves various functions when the calculation device 52 executes programs stored in the storage device 68. As illustrated in FIG. 2, the calculation device 52 functions as an external environment recognition unit 54, a host vehicle position recognition unit 56, an action plan unit 58, a vehicle control unit 64, and a notification control unit 66.

The external environment recognition unit 54 recognizes the peripheral state of the host vehicle 10 on the basis of the information output from the external environment sensor 16, the host vehicle communication device 28, the map unit 34, and the navigation device 36. For example, the external environment recognition unit 54 recognizes the existence, position, size, type, and travel direction of the other vehicle 100 that travels or stops near the host vehicle 10 and moreover recognizes the distance and the relative speed between the host vehicle 10 and the other vehicle 100, on the basis of image information acquired by the cameras 18, information acquired by the radars 24 and the lidars 26, and the external environment information acquired by the first communication device 30. In addition, the external environment recognition unit 54 recognizes the shape and the position of an object included in the road environment (such as roads 110, lane marks, median strips, facilities near the roads, spaces, and stops (streetcar stops or stations) 126) on the basis of the image information acquired by the cameras 18, the information acquired by the radars 24 and the lidars 26, a high-precision map stored in the map unit 34, the map information 42 stored in the navigation device 36, and the external environment information acquired by the second communication device 32. The external environment recognition unit 54 recognizes a signal of a traffic light (a forward traveling permissible state, a forward traveling prohibited state) on the basis of the image information acquired by the cameras 18 or the external environment information acquired by the second communication device 32.

The host vehicle position recognition unit 56 recognizes the position of the host vehicle 10 on the basis of the information output from the map unit 34 and the navigation device 36.

The action plan unit 58 plans an action that is optimal to the host vehicle 10 on the basis of a recognition result from the external environment recognition unit 54 and the host vehicle position recognition unit 56, and the detected information and stored information of the input system device group 14. The action plan unit 58 includes an offset setting unit 60 and an action decision unit 62. The offset setting unit 60 sets an offset amount Of of the host vehicle 10 in a travel lane 120 (FIG. 4, etc.) in the lateral direction on the basis of the peripheral state that is recognized by the external environment recognition unit 54. The action decision unit 62 decides an action in accordance with a generated event, and generates a travel trajectory and a target speed when the travel control is performed.

The vehicle control unit 64 controls the output system device group 70 on the basis of the action planned by the action plan unit 58. For example, the vehicle control unit 64 calculates a steering instruction value based on the travel trajectory generated by the action plan unit 58, and an acceleration/deceleration instruction value based on the target speed, and outputs control instructions to the driving force output device 72, the steering device 74, and the braking device 76.

The notification control unit 66 outputs the notification instruction to the notification device 78 on the basis of a notification action planned by the action plan unit 58.

The storage device 68 illustrated in FIG. 1 stores numerals such as thresholds used in comparison, determination, or the like in each process, in addition to various programs to be executed by the calculation device 52.

2. Operation of Vehicle Control Device 12

Figure 3:
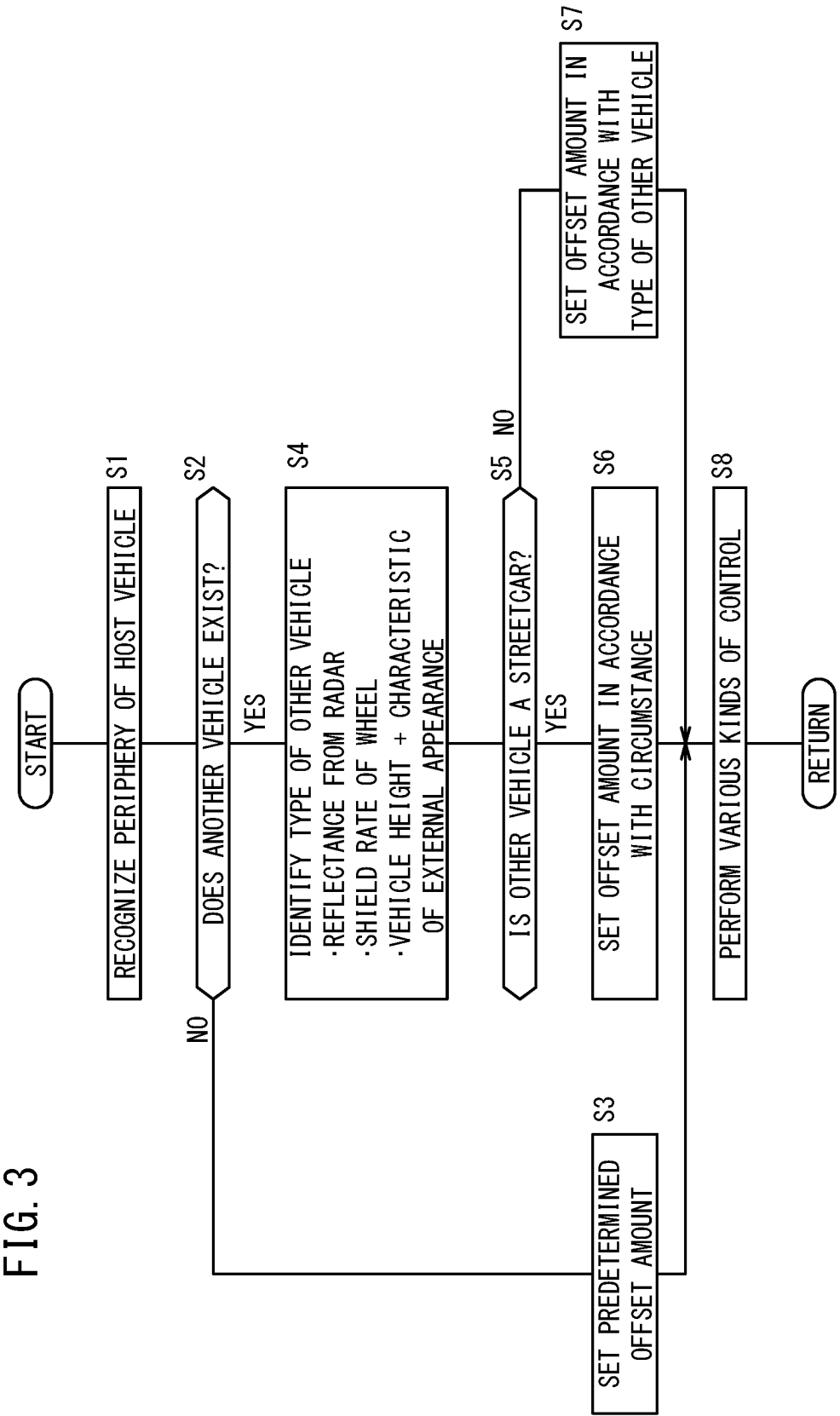
FIG. 3 is a flowchart of a main process to be performed by the vehicle control device according to the present embodiment.

An operation of the vehicle control device 12 is described with reference to FIG. 3. FIG. 4 to FIG. 9, which illustrate circumstances in a region where vehicles keep right, will be used in the following description. In addition, in the description below, a track traveling vehicle that travels along a track (or a streetcar railroad track) 124 laid in a track laid area 122 on a road 110 is a streetcar 104.

In step S1, the external environment recognition unit 54 recognizes a peripheral state of the host vehicle 10 on the basis of the latest information that is output from the input system device group 14. For example, the external environment recognition unit 54 recognizes the other vehicle 100, the stop 126, the form of the stop 126 (with or without a safety zone 128), a person 130 near the stop 126, and the like as illustrated in FIG. 4 to FIG. 9 on the basis of image information acquired by the cameras 18, detection information from the radars 24 and the lidar 26, external environment information acquired by the host vehicle communication device 28, the map information 42, the information from the map unit 34, and the like.

Figure 8:
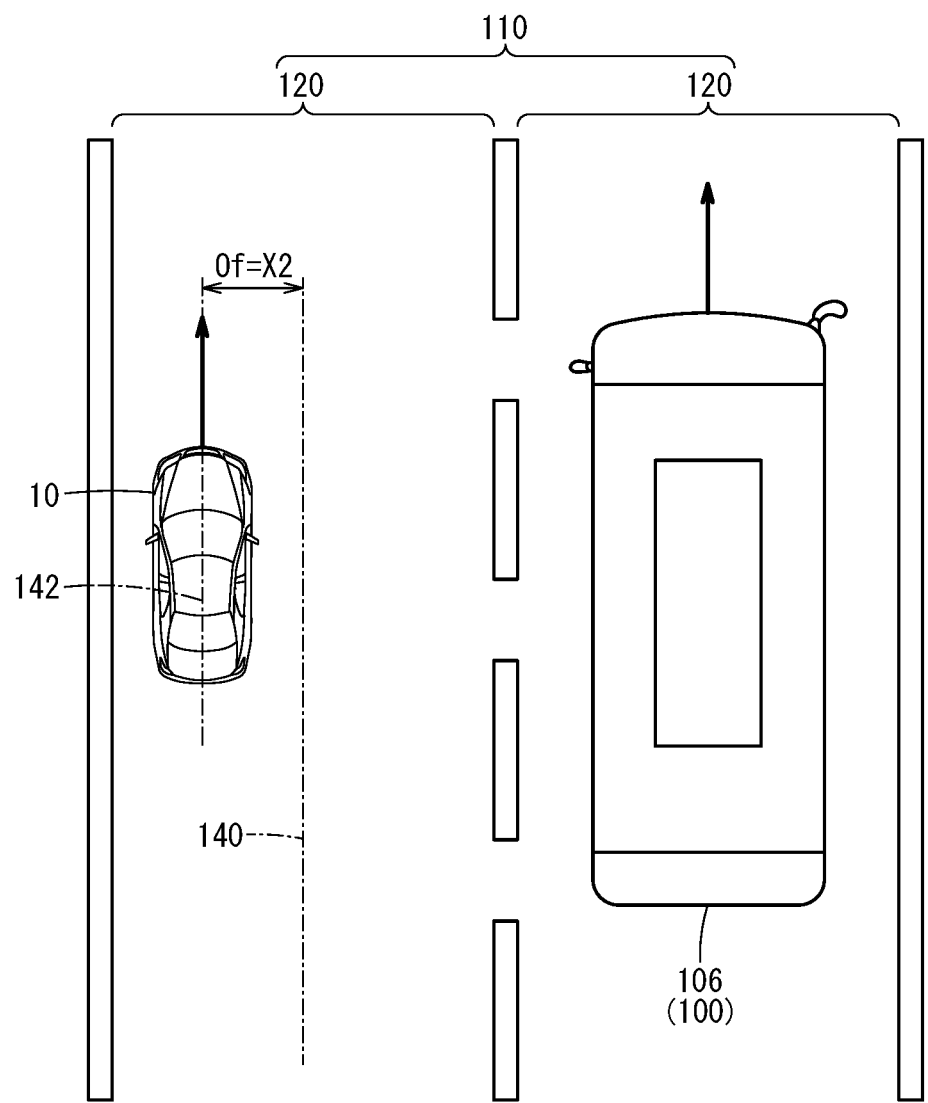
FIG. 8 is a diagram for describing the offset amount that is set in a circumstance where the host vehicle and a large vehicle travel side by side.
Figure 9:
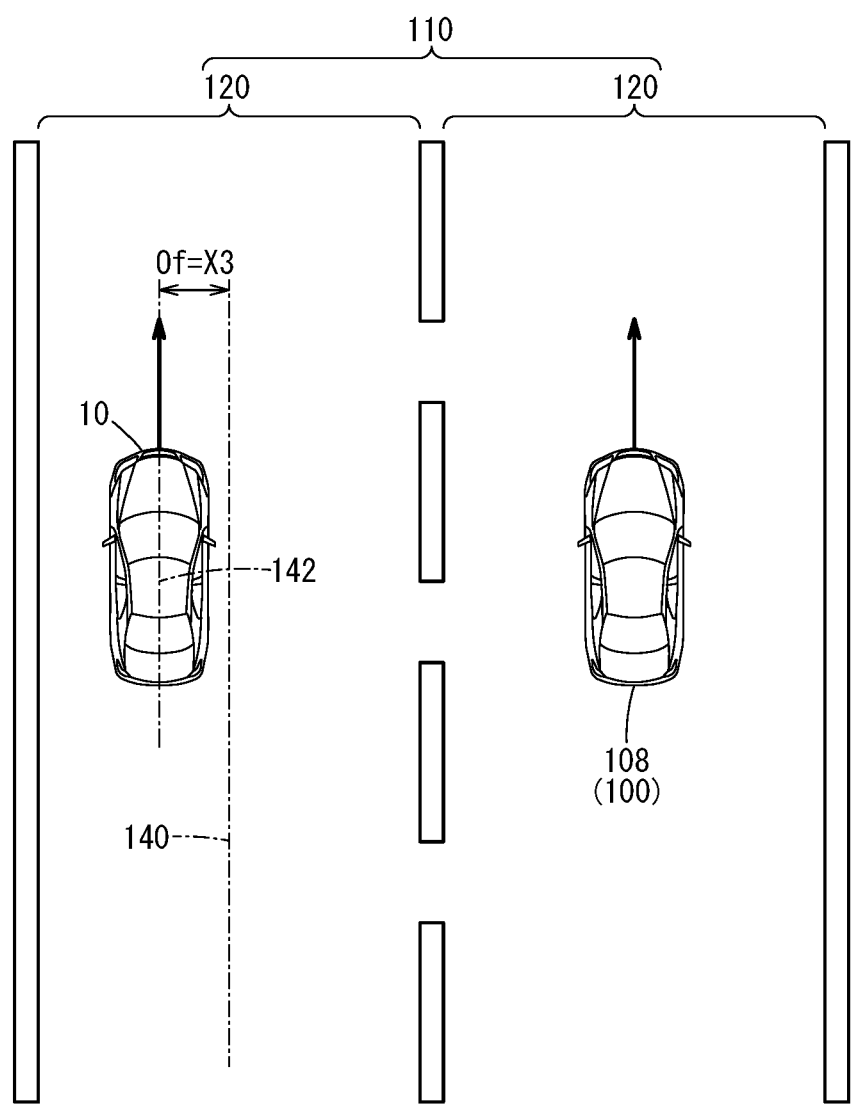
FIG. 9 is a diagram for describing the offset amount that is set in a circumstance where the host vehicle and a normal vehicle travel side by side.
Figure 10:
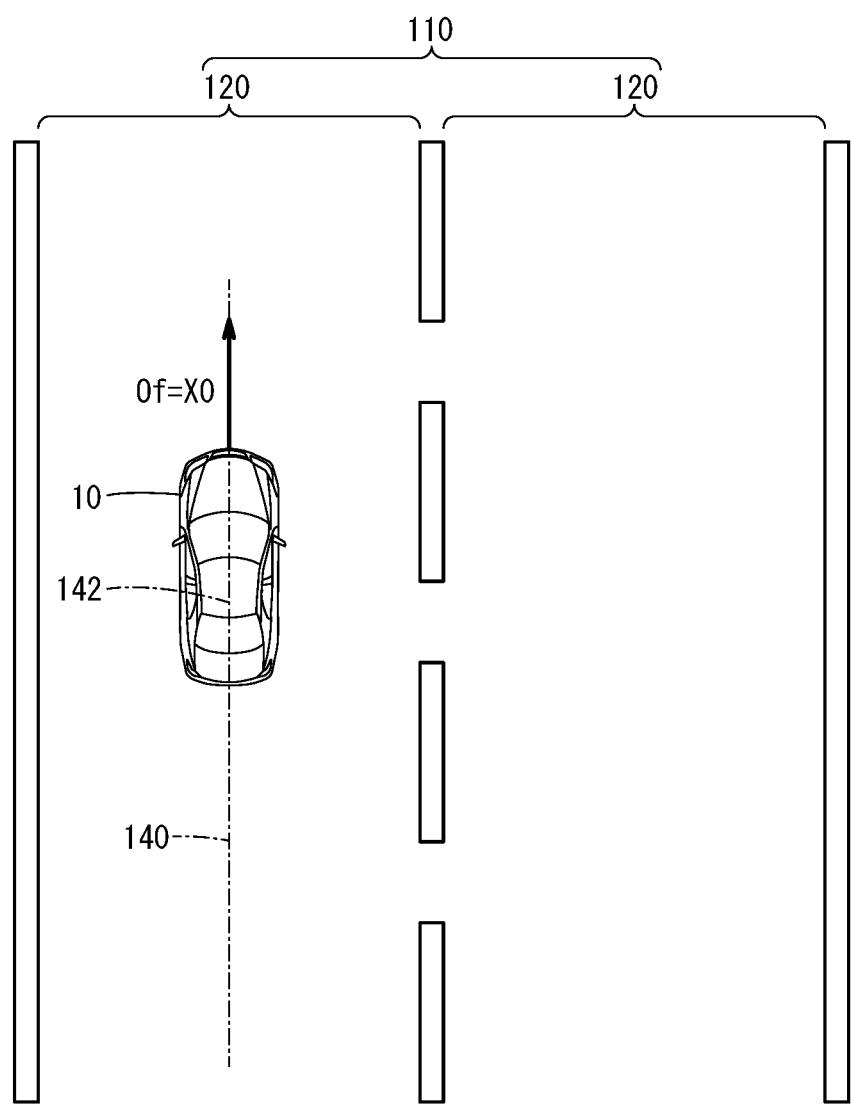
FIG. 10 is a diagram for describing the offset amount that is set in a circumstance where another vehicle does not exist around the host vehicle.

In step S2, it is determined whether the other vehicle 100 that stops or travels in parallel to the host vehicle 10 exists in an area (the track laid area 122 or the travel lane 120 where the other vehicle 100 travels) that is next to the travel lane 120 where the host vehicle 10 travels. If the other vehicle 100 exists as illustrated in FIG. 4 to FIG. 9, the external environment recognition unit 54 recognizes the other vehicle 100 in the area next to the host vehicle 10. In this case (step S2: YES), the process advances to step S4. On the other hand, if the other vehicle 100 does not exist as illustrated in FIG. 10, the external environment recognition unit 54 does not recognize the other vehicle 100 in the area next to the host vehicle 10. In this case (step S2: NO), the process advances to step S3. Note that the distance between the host vehicle 10 and the other vehicle 100 may be set in advance. That is to say, an upper limit value of the distance between the host vehicle 10 and the other vehicle 100 may be set in advance, and it may be determined whether the other vehicle 100 exists in the area within the distance that is less than or equal to the upper limit value from the host vehicle 10.

When the process has advanced from step S2 to step S3, the offset setting unit 60 sets a predetermined amount X0 as the offset amount Of. The offset amount Of refers to the distance between a reference position in the travel lane 120 in the lateral direction (width direction) and a predetermined position of the host vehicle 10. In the present embodiment, the offset amount Of is the distance between a central position 140 of the travel lane 120 in the lateral direction (width direction) and a central axis 142 extended in a vehicle length direction of the host vehicle 10. The predetermined amount X0 set here is smaller than the other predetermined quantities X1 to X3 to be described below, and is zero, for example.

When the process has advanced from step S2 to step S4, the external environment recognition unit 54 identifies the type of the other vehicle 100. One example of the identifying method is described.

For example, by a reflectance R1 of a vehicle body of the other vehicle 100 that is detected by the radar 24 or the lidar 26, whether the other vehicle 100 is the streetcar 104 (FIG. 4 to FIG. 7), a large vehicle 106 (FIG. 8), or a normal vehicle 108 (FIG. 9) can be identified. In general, the vehicle body of the streetcar 104 has a larger area to reflect electric waves or light than the vehicle body of another large vehicle 106. In addition, the vehicle body of the large vehicle 106 has a larger area to reflect electric waves or light than the vehicle body of the normal vehicle 108. In view of this, the external environment recognition unit 54 identifies as the streetcar 104, the other vehicle 100 whose reflectance R1 is more than or equal to a first threshold R1th1. Moreover, the external environment recognition unit 54 identifies as the large vehicle 106, the other vehicle 100 whose reflectance R1 is less than the first threshold R1th1 and more than or equal to a second threshold R1th2 (<R1th1). In addition, the external environment recognition unit 54 identifies as the normal vehicle 108, the other vehicle 100 whose reflectance R1 is less than the second threshold R1th2.

In another example, by a reflectance R2 of a road surface of the road 110 that is detected by the radar 24 or the lidar 26, whether the other vehicle 100 is the streetcar 104 or other vehicle than the streetcar 104 can be identified. In the track laid area 122 where the streetcar 104 travels, the track 124 made of metal is laid. Therefore, the road surface of the track laid area 122 reflects electric waves and light more than the road surface of the normal road 110 does. In view of this, the external environment recognition unit 54 identifies as the track laid area 122, an area whose reflectance R2 is more than or equal to a threshold R2th, and identifies the other vehicle 100 that travels in such an area as the streetcar 104. In addition, the external environment recognition unit 54 identifies as the normal road 110, an area whose reflectance R2 is less than the threshold R2th, and identifies the other vehicle 100 that travels in such an area as the vehicle other than the streetcar 104. Furthermore, whether the other vehicle 100 is the large vehicle 106 or the normal vehicle 108 is identified based on the image information or the like.

For example, by using an indicator expressing the visibility of a wheel, here a shield rate SR, whether the other vehicle 100 is the streetcar 104 or other vehicle than the streetcar 104 can be identified. The wheels of a general automobile are exposed to the outside and therefore, the whole wheels can be seen from the outside. On the other hand, the wheels of the streetcar 104 are covered in the vehicle body and only a part thereof can be seen from the outside. In view of this, the external environment recognition unit 54 identifies the wheels that are present in a lower part of the other vehicle 100 on the basis of the image information from the cameras 18, and determines how much the external shape of the wheels can be recognized, so that the shield rate SR is calculated. Then, the other vehicle 100 whose shield rate SR is less than a threshold SRth is identified as the streetcar 104, and the other vehicle 100 whose shield rate SR is more than or equal to the threshold SRth is identified as other vehicle than the streetcar 104. In addition, the other vehicle 100 whose wheel diameter $\varphi$ is more than or equal to a threshold $\varphi$th is identified as the large vehicle 106, and the other vehicle 100 whose wheel diameter $\varphi$ is less than the threshold $\varphi$th is identified as the normal vehicle 108.

For example, whether the other vehicle 100 is the streetcar 104, the large vehicle 106, or the normal vehicle 108 can be identified based on a vehicle height H and a characteristic of an external appearance. Here, the external environment recognition unit 54 recognizes the vehicle height H of the other vehicle 100 on the basis of the image information from the cameras 18. In addition, the external environment recognition unit 54 recognizes the characteristic of the external appearance such as the presence or absence of a pantograph, the position, the number, and the shape of lights, and the destination displayed in a destination indicator. If the other vehicle 100 has the vehicle height H that is more than or equal to a first threshold Hth1 and the characteristic of the streetcar 104, the other vehicle 100 is identified as the streetcar 104. If the other vehicle 100 has the vehicle height H that is less than the first threshold Hth1 and more than or equal to a second threshold Hth2 (<Hth1), or if the other vehicle 100 has the vehicle height H that is more than or equal to the first threshold Hth1 but does not have the characteristic of the streetcar 104, the other vehicle 100 is identified as the large vehicle 106. In addition, the other vehicle 100 whose vehicle height H is less than the second threshold Hth2 is identified as the normal vehicle 108. Note that the information regarding the destination of the streetcar 104 traveling in that area is stored in advance in the storage device 68 or another memory. Then, if the destination is recognized, the destination recognized based on the image information is compared with the destination stored in the storage device 68 and if those destinations are the same, the other vehicle 100 is identified as the streetcar 104.

In addition, the external environment information that the first communication device 30 acquires from the other-vehicle communication device 102 of the other vehicle 100 may include information expressing the type of the other vehicle 100. The external environment recognition unit 54 can also identify the type of the other vehicle 100 on the basis of this external environment information.

In step S5, whether the other vehicle 100 is the streetcar 104 is determined on the basis of the identification result in step S4. If the other vehicle 100 is the streetcar 104 (step S5: YES), the process advances to step S6. On the other hand, if the other vehicle 100 is other vehicle than the streetcar 104 (the large vehicle 106 or the normal vehicle 108) (step S5: NO), the process advances to step S7.

Figure 4:
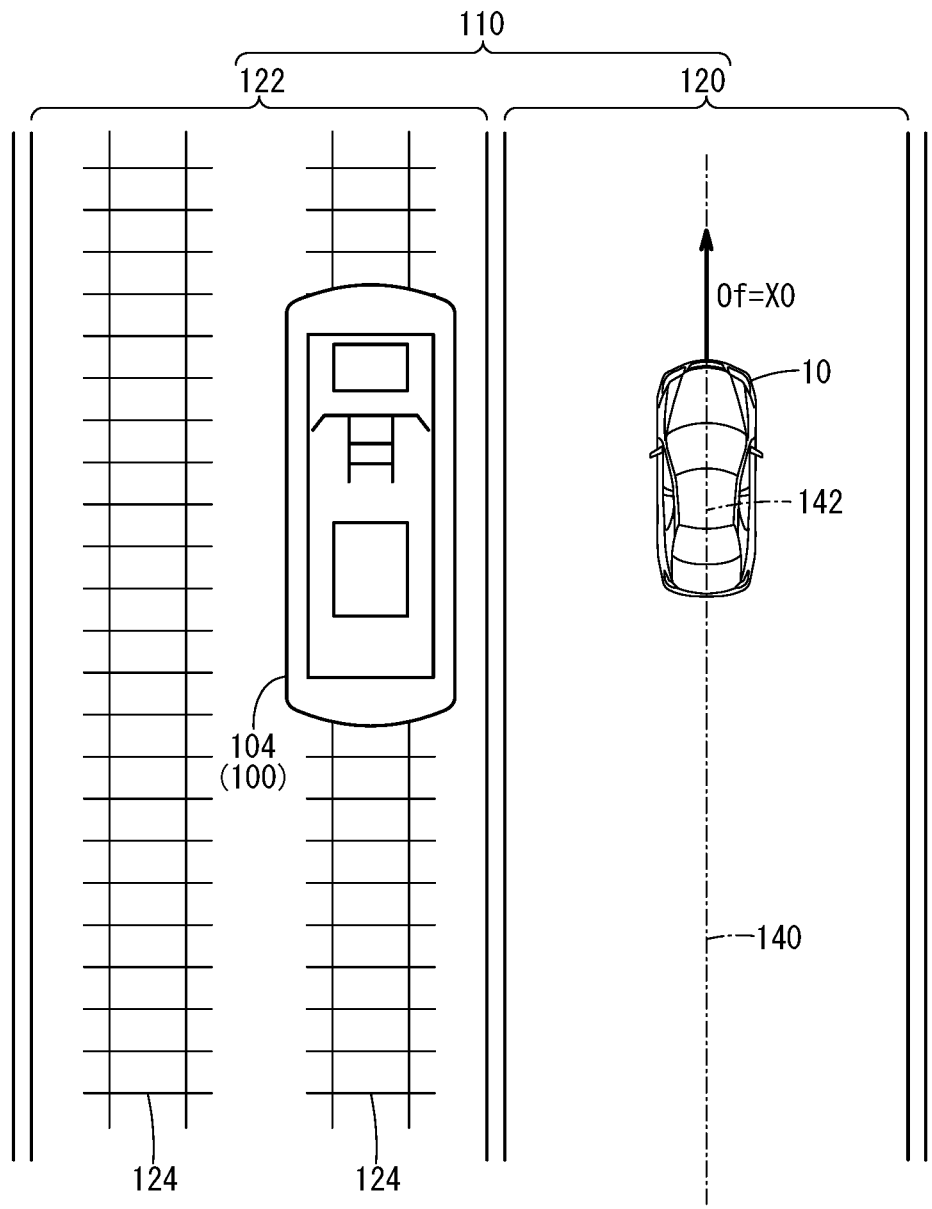
FIG. 4 is a diagram for describing an offset amount that is set in a circumstance where the host vehicle and a streetcar travel side by side.
Figure 5:
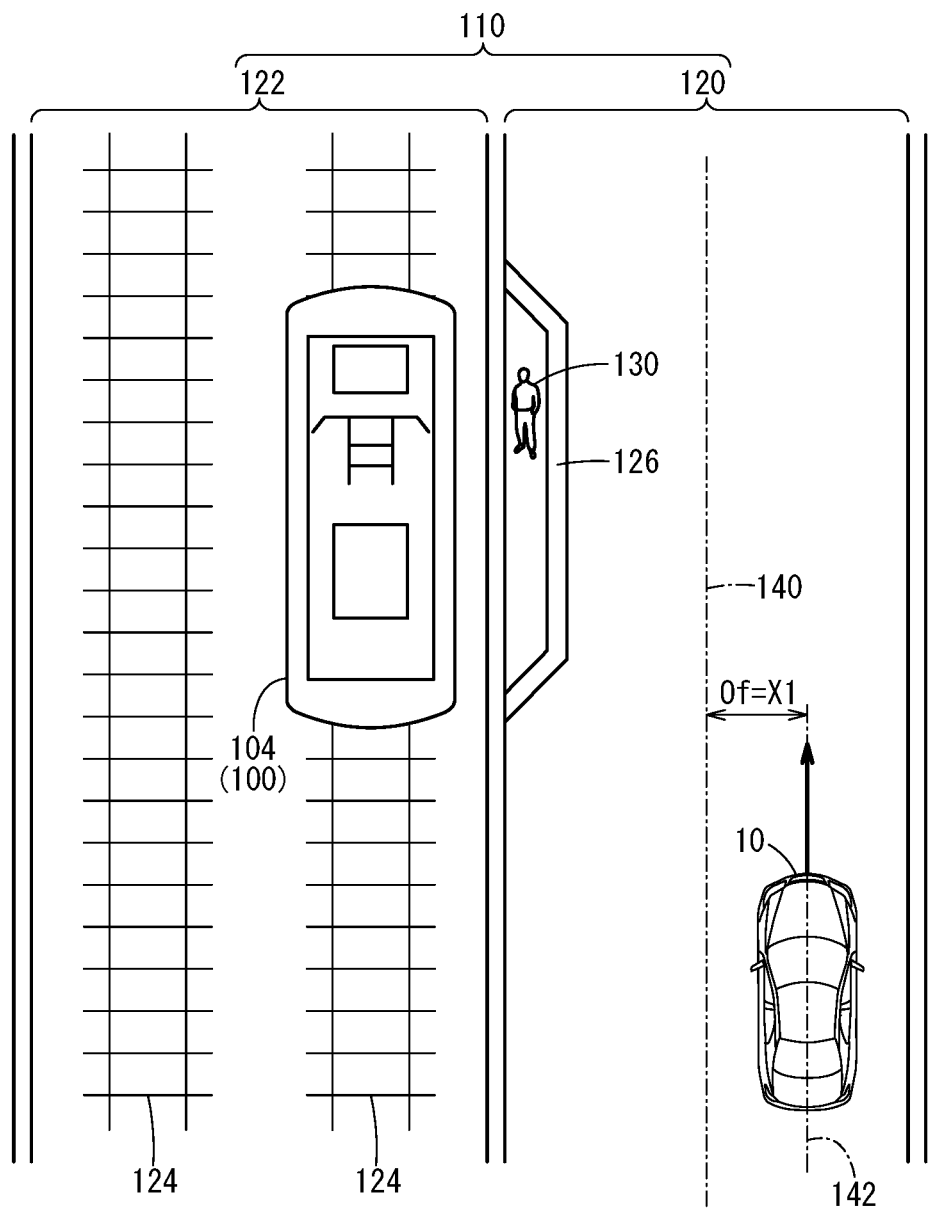
FIG. 5 is a diagram for describing the offset amount that is set in a circumstance where a stop does not include a safety zone.
Figure 6:
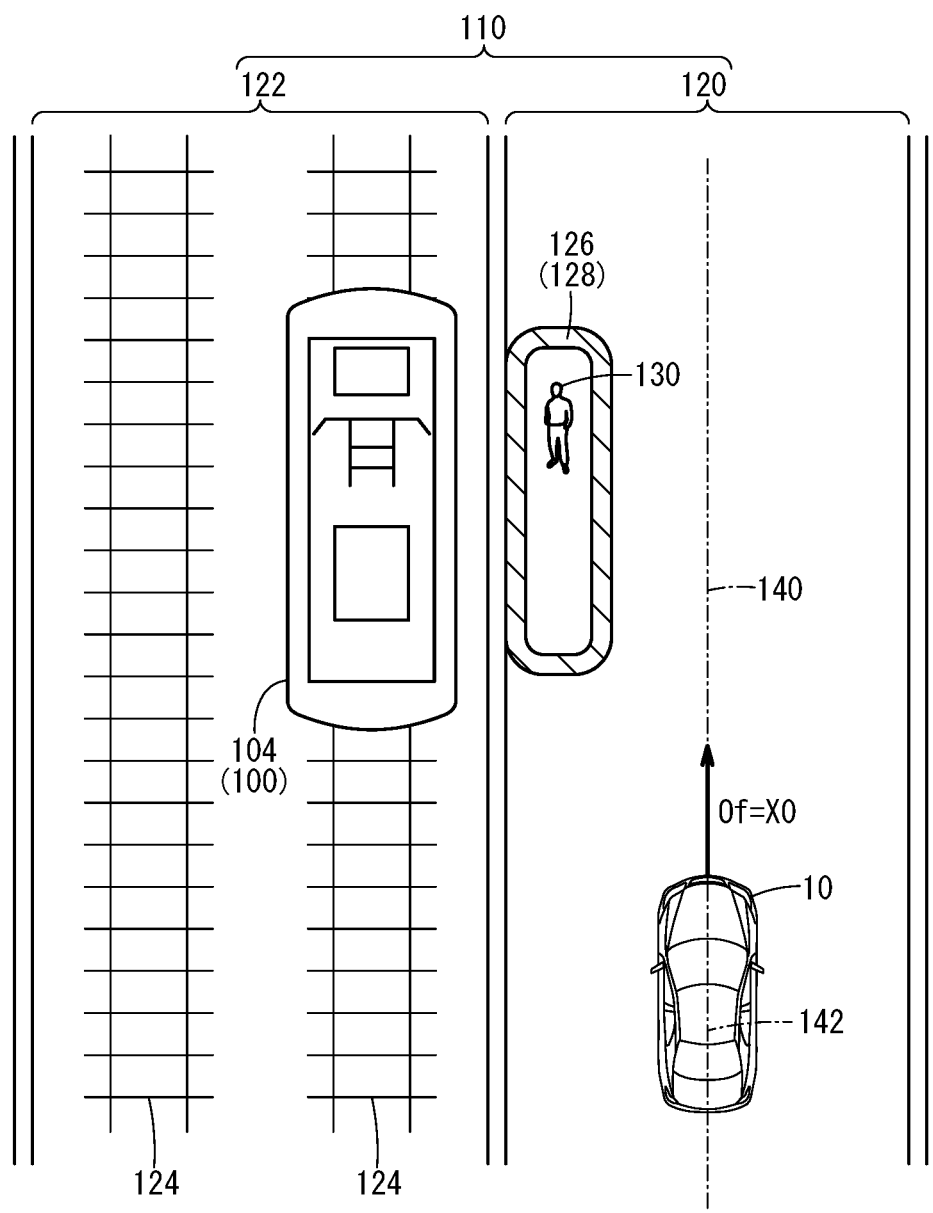
FIG. 6 is a diagram for describing the offset amount that is set in a circumstance where the stop includes the safety zone.
Figure 7:
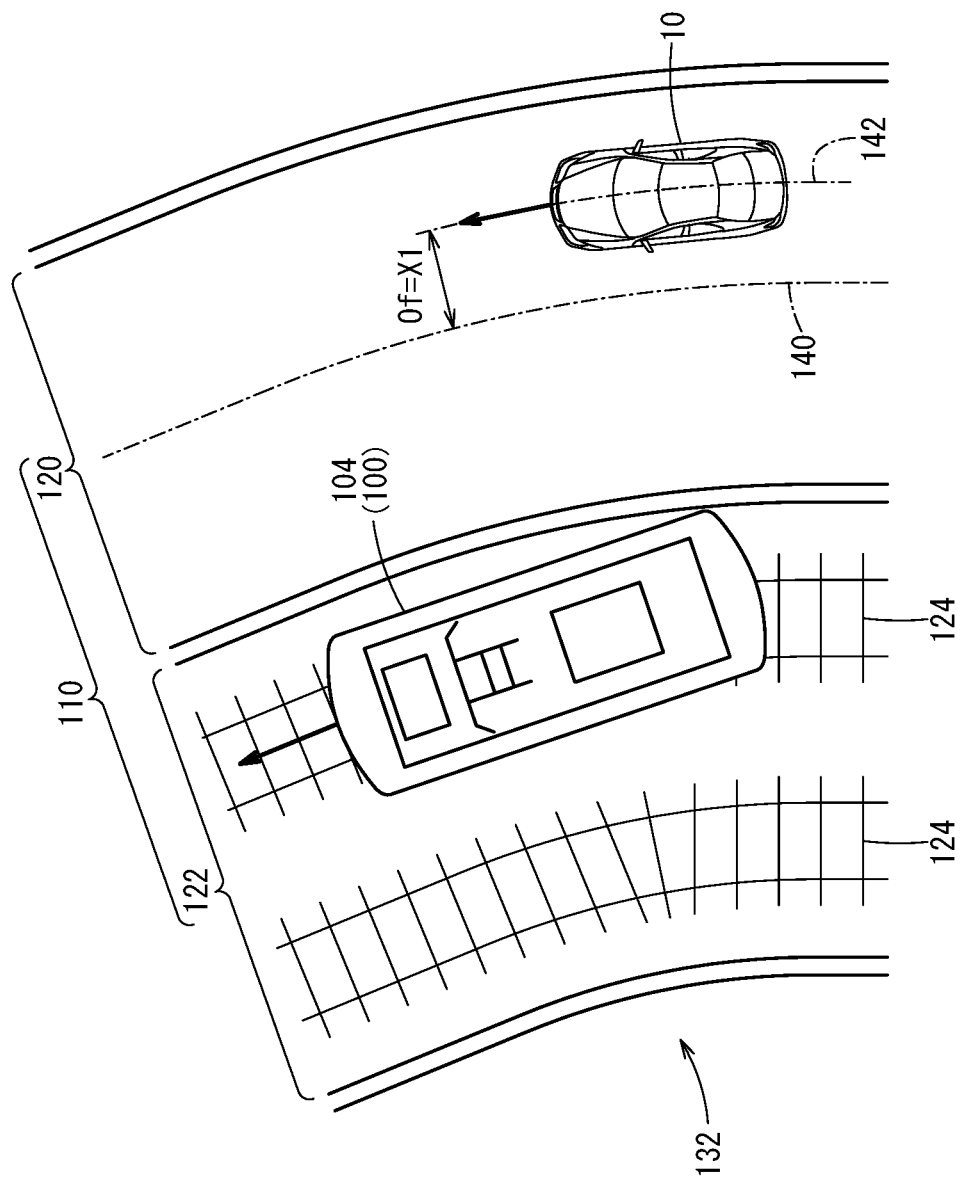
FIG. 7 is a diagram for describing the offset amount that is set in a circumstance where the streetcar travels along a curve.

When the process has advanced from step S5 to step S6, the offset setting unit 60 sets the offset amount Of in accordance with the circumstance. Examples of the circumstances are illustrated in FIG. 4 to FIG. 7 (No. 1, No. 2, No. 3, No. 4, No. 9, No. 10 in FIG. 11). In the circumstance as illustrated in FIG. 4 where the host vehicle 10 and the streetcar 104 travel side by side (No. 9 in FIG. 11), the offset setting unit 60 sets as the offset amount Of, the predetermined amount X0 that is the same as the amount in step S3. In the circumstance as illustrated in FIG. 5 where the streetcar 104 stops in the stop 126 in the travel direction of the host vehicle 10 and the safety zone 128 does not exist (No. 1, No. 2 in FIG. 11), the offset setting unit 60 sets the predetermined amount X1 as the offset amount Of. In the circumstance as illustrated in FIG. 6 where the streetcar 104 stops in the stop 126 and the safety zone 128 exists (No. 3, No. 4 in FIG. 11), the offset setting unit 60 sets as the offset amount Of, the predetermined amount X0 that is the same as the amount in step S3. In the circumstance as illustrated in FIG. 7 where the host vehicle 10 and the streetcar 104 travel side by side in a curve 132 (No. 10 in FIG. 11), the offset setting unit 60 sets the predetermined amount X1 as the offset amount Of. Here, the external environment recognition unit 54 recognizes the curvature of the track 124 of the streetcar 104 on the basis of the image information, the map information 42, the information in the map unit 34, or the like. When the curvature is more than or equal to a predetermined curvature, the offset setting unit 60 sets the predetermined amount X1 as the offset amount Of. Depending on the curvature, the offset amount Of may be varied. The offset amount Of=X1, which is set in the circumstances in FIG. 5 and FIG. 7, is set in a direction of separating the host vehicle 10 from the streetcar 104.

When the process has advanced from step S5 to step S7, the offset setting unit 60 sets the offset amount in accordance with the type of the other vehicle 100. In the circumstance as illustrated in FIG. 8 where the host vehicle 10 and the large vehicle 106 travel side by side, the offset setting unit 60 sets the predetermined amount X2 (<X1) as the offset amount Of. In the circumstance as illustrated in FIG. 9 where the host vehicle 10 and the normal vehicle 108 travel side by side, the offset setting unit 60 sets the predetermined amount X3 (<X2) as the offset amount Of.

When the process has advanced from any of step S3, step S6, and step S7 to step S8, various kinds of control are performed. The action decision unit 62 decides the travel position of the host vehicle 10 in the travel lane 120 in the lateral direction on the basis of the offset amount set by the offset setting unit 60, and generates the travel trajectory for causing the host vehicle 10 to travel at the decided travel position. In addition, as shown in FIG. 11, the action decision unit 62 determines whether the host vehicle 10 needs to slow down or stop on the basis of the recognition result from the external environment recognition unit 54, here the form of the stop 126 that is positioned in the travel direction of the host vehicle 10 (presence or absence of the safety zone 128) or the recognition result as to whether the person 130 is present near the stop 126, and then generates the target speed. The vehicle control unit 64 calculates the acceleration/deceleration instruction value and the steering instruction value that are necessary to cause the host vehicle 10 to travel at the target speed along the travel trajectory, and outputs the values to the output system device group 70. The driving force output device 72, the steering device 74, and the braking device 76 operate in accordance with the instructions output from the vehicle control unit 64.

3. Summary of the Present Embodiment

The vehicle control device 12 includes the external environment recognition unit 54 configured to recognize the peripheral state of the host vehicle 10, the offset setting unit 60 configured to set the offset amount Of of the host vehicle 10 in the travel lane 120 in the lateral direction on the basis of the peripheral state that is recognized by the external environment recognition unit 54, and the vehicle control unit 64 configured to perform the travel position control of the host vehicle 10 on the basis of the offset amount Of that is set by the offset setting unit 60. If the external environment recognition unit 54 recognizes the other vehicle 100 that is positioned along the travel lane 120, the offset setting unit 60 is configured to set the offset amount Of in the direction of separating the host vehicle 10 from the other vehicle 100. The offset setting unit 60 is configured to set the offset amount Of (predetermined amount X0) to be smaller in the case where the external environment recognition unit 54 identifies the other vehicle 100 as the track traveling vehicle, compared with the offset amount Of (predetermined amount X2, X3) in the case where the external environment recognition unit 54 identifies the other vehicle 100 as the vehicle other than the streetcar 104 (the large vehicle 106, the normal vehicle 108). The track traveling vehicle is a vehicle that travels on the track 124 laid on the road 110, for example, the streetcar 104.

In the above configuration, the offset amount Of that is set in the case where the other vehicle 100 is the streetcar 104 is smaller than the offset amount Of that is set in the case where the other vehicle 100 is other vehicle than the streetcar 104. The other vehicle 100 may travel out of the travel lane 120; on the other hand, the streetcar 104 does not travel out of the track 124. Therefore, the offset for the streetcar 104 may be the minimum offset. In other words, a large offset is unnecessary. Therefore, in the case where the streetcar 104 travels or stops next to the host vehicle 10, the host vehicle 10 can travel at the substantially constant position in the travel lane 120. In addition, in the case where the other vehicle 100 other than the streetcar 104 travels or stops next to the host vehicle 10, the host vehicle 10 can stay away from the other vehicle 100 to some extent. In this manner, the host vehicle 10 can travel at the optimal position in the travel lane 120.

If the track 124 of the streetcar 104 or the travel lane 120 that is recognized by the external environment recognition unit 54 has the predetermined curvature or more, the offset setting unit 60 is configured to set the offset amount Of in accordance with the curvature of the track 124 or the travel lane 120.

In the scene where the streetcar 104 curves, a part of the vehicle body of the streetcar 104 approaches the next travel lane 120. In the above configuration, the offset amount Of is set in accordance with the curvature of the track 124 or the travel lane 120. Therefore, the host vehicle 10 can stay away to some extent from the streetcar 104 that curves.

If the reflectance R1 of the vehicle body of the other vehicle 100 that is detected by the radar 24 or the lidar 26 is more than or equal to the predetermined first threshold R1th1, the external environment recognition unit 54 is configured to identify the other vehicle 100 as the streetcar 104.

The vehicle body of the streetcar 104 has a larger area to reflect electric waves than the vehicle body of the vehicle other than the streetcar 104, such as the large vehicle 106 or the normal vehicle 108. Therefore, by detecting the reflectance R1 of the vehicle body by the radar 24 or the lidar 26 as described in the above configuration, it is possible to determine whether the other vehicle 100 is the streetcar 104 or the vehicle other than the streetcar 104.

If the reflectance R2 of the road surface that is detected by the radar 24 or the lidar 26 is more than or equal to the predetermined threshold R2th, the external environment recognition unit 54 is configured to identify the other vehicle 100 as the streetcar 104.

The road surface of the road 110 where the track 124 made of metal is laid reflects more electric waves than the road surface of a general road 110. Therefore, by detecting the reflectance R2 of the road surface by the radar 24 or the lidar 26 as described in the above configuration, it is possible to determine whether the other vehicle 100 traveling on the road surface is the streetcar 104 or the vehicle other than the streetcar 104.

If the indicator expressing the visibility of the wheel of the other vehicle 100, for example the shield rate SR, is less than the predetermined threshold SRth, the external environment recognition unit 54 is configured to identify the other vehicle 100 as the streetcar 104.

The shield rate SR of the wheel of the streetcar 104 is higher than that of the vehicle other than the streetcar 104, and the wheel of the streetcar 104 is less visible from the host vehicle 10. Therefore, as described in the above configuration, by detecting the indicator expressing the visibility of the wheel of the other vehicle 100, for example the shield rate SR of the wheel, it is possible to determine whether the other vehicle 100 is the streetcar 104 or the vehicle other than the streetcar 104.

If the other vehicle 100 has the vehicle height H that is more than or equal to the predetermined first threshold Hth1 and it is recognized that the other vehicle 100 has the characteristic of the external appearance of the streetcar 104, the external environment recognition unit 54 is configured to identify the other vehicle 100 as the streetcar 104.

The streetcar 104 has the higher vehicle height H than the vehicle other than the streetcar 104. In addition, the streetcar 104 may have the characteristic in its external appearance.

Therefore, by detecting the vehicle height H and the characteristic of the external appearance as described in the above configuration, it is possible to determine whether the other vehicle 100 is the streetcar 104 or the vehicle other than the streetcar 104.

In the case where the external environment recognition unit 54 recognizes the stop 126 of the streetcar 104 in the travel direction of the host vehicle 10, the offset setting unit 60 is configured to set the offset amount Of in accordance with the presence or absence of the streetcar 104 in the stop 126 and/or the form of the stop 126.

The optimal offset amount of the host vehicle 10 is different depending on whether the streetcar 104 stops or does not stop in the stop 126 or whether the stop 126 has or does not have the safety zone 128, for example. By the above configuration, the offset amount is set in accordance with the presence or absence of the streetcar 104 in the stop 126 and/or the form or type of the stop 126. Therefore, near the stop 126, the host vehicle 10 can travel at the optimal position in the travel lane 120.

The vehicle control device according to the present invention is not limited to the embodiment above, and can employ various configurations without departing from the concept of the present invention.

What is claimed is:

1. A vehicle control device comprising one or more processors that execute computer-executable instructions stored in a memory, wherein the one or more processors execute the computer-executable instructions to cause the vehicle control device to:
   recognize a peripheral state of a host vehicle;
   set an offset amount of the host vehicle in a travel lane in a lateral direction on a basis of the peripheral state; and
   perform travel position control of the host vehicle on the basis of the offset amount,
   wherein when another vehicle that is positioned along the travel lane is recognized, the one or more processors set the offset amount in a direction of separating the host vehicle from the other vehicle, and set the offset amount to be smaller in a case where the other vehicle is identified as a track traveling vehicle, compared with the offset amount in a case where the other vehicle is identified as a vehicle other than the track traveling vehicle, the track traveling vehicle being a vehicle traveling on a track laid on a road, and
   wherein if an indicator expressing visibility of a wheel of the other vehicle is less than a predetermined threshold, the one or more processors cause the vehicle control device to identify the other vehicle as the track traveling vehicle.

2. The vehicle control device according to claim 1, wherein if the vehicle control device recognizes that the track or the travel lane has a predetermined curvature or more, the one or more processors cause the vehicle control device to set the offset amount in accordance with the curvature of the track or the travel lane.

3. The vehicle control device according to claim 1, wherein if the other vehicle has a vehicle height that is more than or equal to a predetermined threshold and it is recognized that the other vehicle has a characteristic of an external appearance of the track traveling vehicle, the one or more processors cause the vehicle control device to identify the other vehicle as the track traveling vehicle.

* * * * *